Dec. 22, 1925.
N. FRENNE ET AL
1,566,850
CONTROLLING APPARATUS
Filed August 7, 1920     3 Sheets-Sheet 1
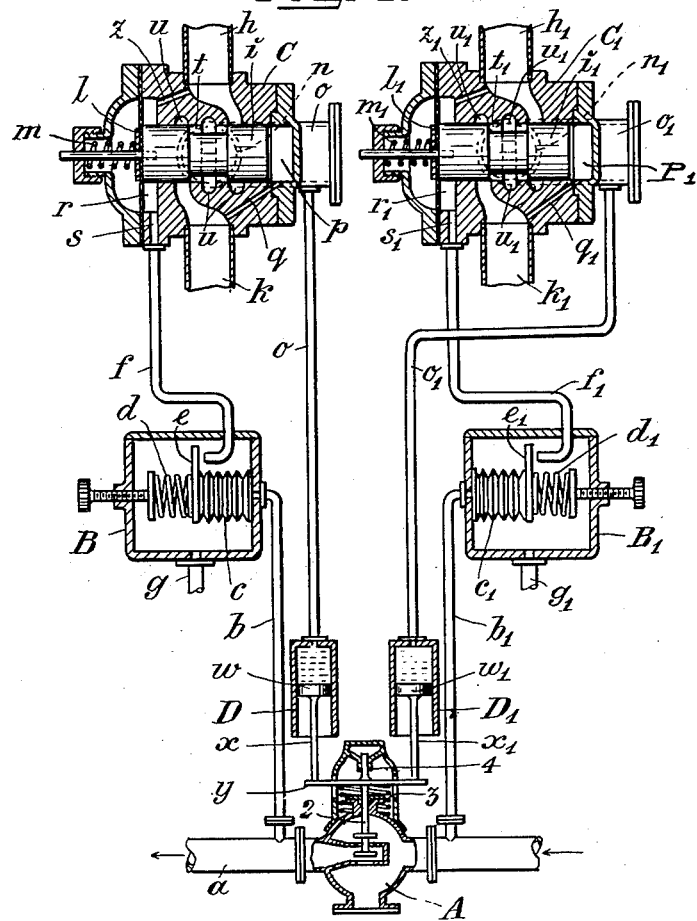
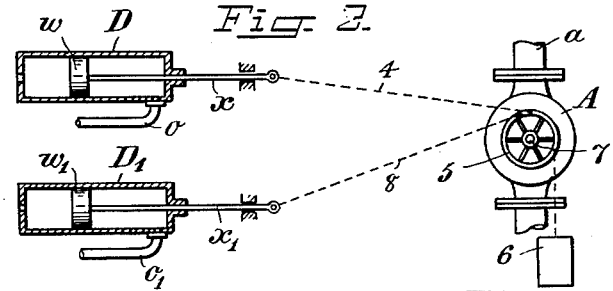
Inventors
N. Frenne
A. G. Saxberg
By H. R. Kerslake
Attorney

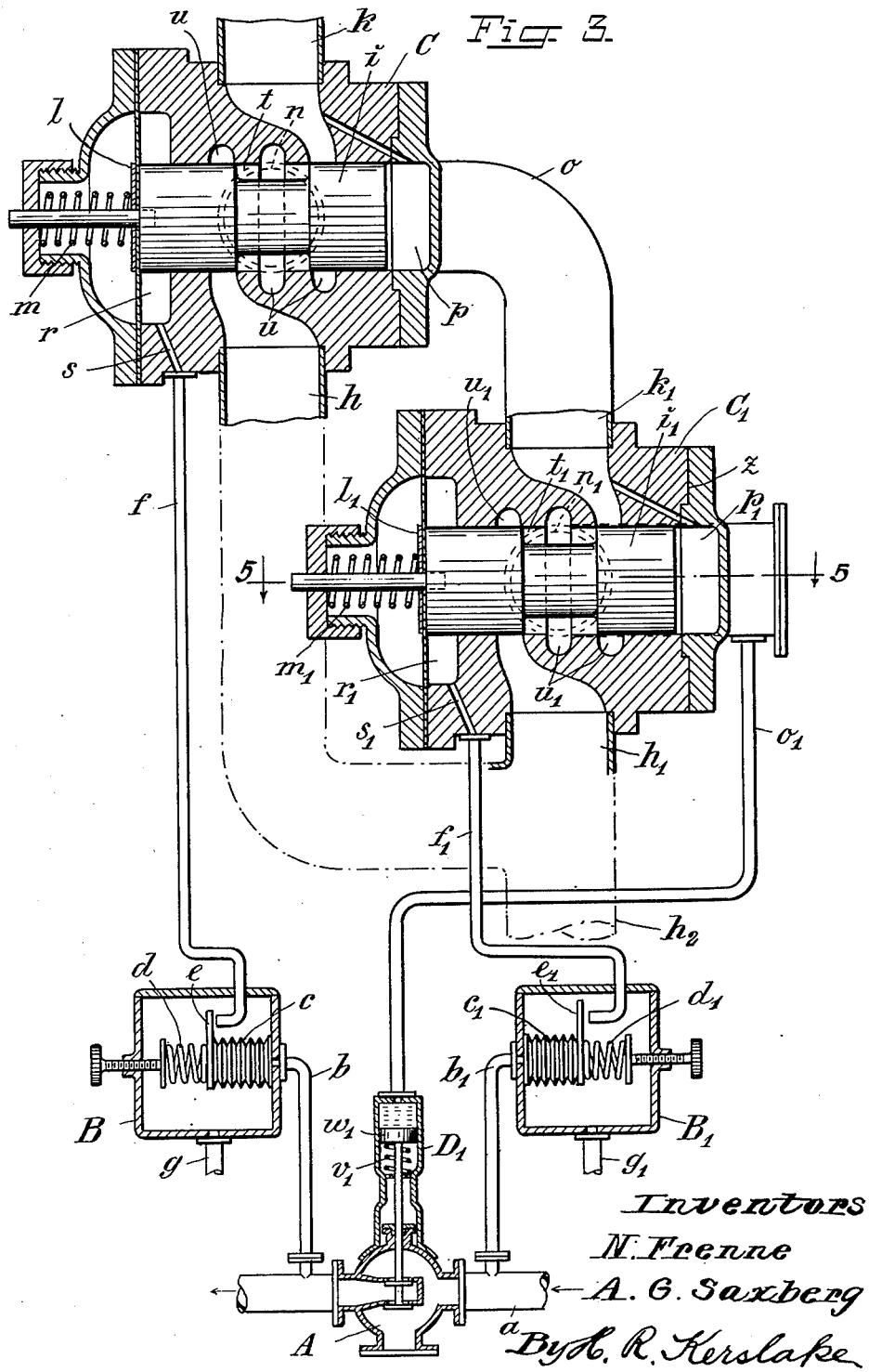

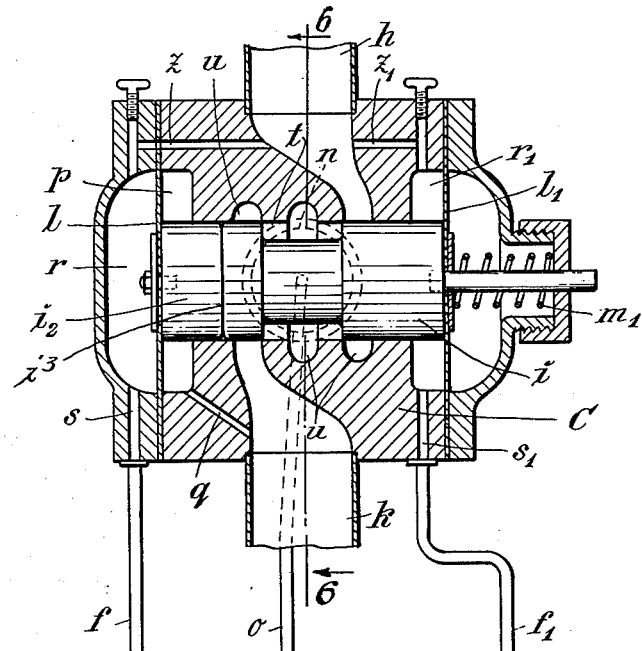
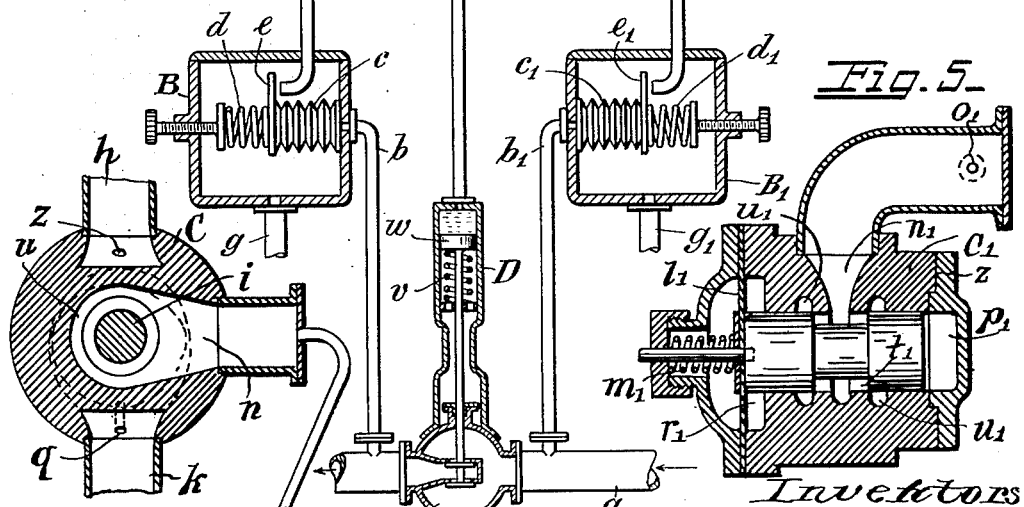

Patented Dec. 22, 1925.

1,566,850

UNITED STATES PATENT OFFICE.

NILS FRENNE AND ÅKE GÖRAN SAXBERG, OF STOCKHOLM, SWEDEN, ASSIGNORS TO AKTIEBOLAGET VAPORACKUMULATOR, OF STOCKHOLM, SWEDEN, A CORPORATION.

CONTROLLING APPARATUS.

Application filed August 7, 1920. Serial No. 402,037.

*To all whom it may concern:*

Be it known that we, NILS FRENNE and ÅKE GÖRAN SAXBERG, both subjects of the King of Sweden, and residing at Stockholm, Sweden, have invented certain new and useful Improvements in Controlling Apparatus, of which the following is a specification.

This invention relates to control apparatus and more particularly to control apparatus of the indirect type wherein actuation of a main control member is effected through the intermediary of liquid under pressure. The invention aims to provide an apparatus whereby a single main control member is controlled by a plurality of impulses wherein one impulse may move the main control member in one direction regardless of the tendency of another impulse to move the main control member in another direction and regardless of relative values of the impulses so that one impulse predominates over another.

Other objects as well as the nature, characteristic features and scope of the invention will be more readily understood from the following description taken in connection with the accompanying drawings and pointed out in the claims, forming a part of this specification.

The invention is clearly illustrated in the accompanying drawings, in which:—

Fig. 1 is a diagrammatic view partly in section illustrating one embodiment of the invention, Fig. 2 is a similar view of a modified arrangement of the servomotor for use in connection with the arrangement shown in Fig. 1, Fig. 3 is a diagrammatic view partly in section of a modified arrangement of the invention, Fig. 4 is a similar view of a still further modification of the invention.

Fig. 5, is the cross section taken on the line 5—5, Fig. 3.

Fig. 6, is a cross section taken on the line 6—6, Fig. 4.

In Fig. 1 the valve A constitutes the main control member and is inserted in conduit $a$.

Extending from the conduit $a$ at each side of the valve A to relays B and $B_1$ respectively are pipes $b$ and $b_1$ respectively, said relays being only shown diagrammatically. The pipes open into bellows $c$ and $c_1$ respectively supporting controlling plates $e$ and $e_1$ respectively actuated by springs $d$ and $d_1$ respectively and positioned immediately in front of pressure liquid conduits $f$ and $f_1$ respectively. The relays B and $B_1$ are so constructed that the one opens and the other closes upon increase of pressure inside the bellows and vice versa upon decrease thereof. In the embodiment shown this is attained by the orifices of the conduits $f$, $f_1$ being directed to the same side, the bellows $c$, $c_1$ being directed to opposite sides of the movable controlling plates $e$ and $e_1$.

$g$ and $g_1$ respectively are outlets for the liquid flowing through the conduits $f$ and $f_1$ respectively.

The conduits $f$ and $f_1$ respectively lead to the slide valve housings C and $C_1$ respectively constructed in the following manner.

$h$ and $h_1$ respectively designate inlets and $k$ and $k_1$ respectively outlets for a pressure liquid, for instance water, from a water conduit. $i$ and $i_1$ respectively denote slide valves connected with diaphragms $l$ and $l_1$ respectively which are acted upon by springs $m$ and $m_1$ respectively. $n$ and $n_1$ respectively denote apertures in the wall of the valve housing connected with pressure pipes $o$ and $o_1$ respectively. The chambers $p$ and $p_1$ respectively at the one side of the slide valve are connected with the outlets $k$ and $k_1$ respectively by means of channels $q$ and $q_1$ respectively. The pressure chambers $r$ and $r_1$ respectively at the other end of the slide valves are, by means of the outlets $s$ and $s_1$ respectively in connection with the conduits $f$ and $f_1$ respectively and by means of channels $z$ and $z_1$ respectively with the inlets $h$ and $h_1$ respectively.

The slide valves $i$ and $i_1$ are provided with annular recesses or grooves $t$ and $t_1$ of such a length that by means of the same the apertures $n$ and $n_1$ respectively are in connection either with the inlets $h$ and $h_1$ respectively or with the outlets $k$ and $k_1$ respectively but not with both at the same time. All the pipes $h$, $h_1$, $k$, $k_1$ and $o$, $o_1$ open at the slide valve into annular recesses $u$ and $u_1$ respectively.

In the drawing the slide valves are shown in their middle position.

The pressure pipes $o$ and $o_1$ lead to the pressure cylinders D and $D_1$ respectively, constituting servo-motors, whose pistons $w$ and $w_1$ respectively actuated by the spring 3 rest, by the aid of the piston rods $x$ and $x_1$, loosely against the cross-piece $y$. Said cross-piece is attached to the spindle 2 of the valve A, the spindle being guided in a guide 4, and the cross-piece being thereby movable only in the longitudinal direction of the valve spindle 2.

The working manner of the apparatus is as follows:

Supposing the pressure in the conduit $a$ after the valve A to be reduced below the pressure for which the controlling device is adjusted and to which the same, consequently, is to be adjusted, the pressure inside the bellows $c$ will decrease, and on account thereof the liquid outlet through the conduit $f$ will be somewhat contracted. Consequently the outflow through the outlet $s$ will be reduced, and the pressure in the pressure chamber $r$ will increase, since the supply to the chamber $r$ through the channel $z$ is constant. When the pressure in the chamber $r$ is increased, the slide valve moves to the left, the pressure pipe $o$ thereby being connected with the outlet $k$ by the aid of the recess $t$ and the two recesses $u$ at the left side. By this operation the pressure cylinder D will be connected through the pipe $o$ with the outlet $k$, the liquid pressure on the piston $w$ being decreased, the spring 3 thereby moving the cross-piece $y$ upwards. The valve spindle 2 is somewhat raised and the valve is opened, the pressure increasing in the pipe branch positioned after the valve A. The desired regulation has consequently been effected.

If instead thereof the pressure in the branch of the conduit $a$ positioned after the valve A be increased, the effect will be the contrary, that is to say, increase of pressure in the bellows, decrease of pressure in the chamber $r$, movement of the slide valve $i$ to the right, connection of the pressure pipe $o$ with the supply $h$, increase of pressure in D and consequently shutting of the valve A more or less and decrease of pressure after the valve.

The channels $q$ and $q$, prevent a pressure or vacuum in chambers $p$ and $p$.

In the same manner the devices $B_1$, $C_1$ and $D_1$ operate upon increasing or decreasing pressure in the conduit $a$ before the valve A.

Obviously, the valve A will be controlled by means of this device upon variations before and after the same as well as upon simultaneous variations before and after the valve.

In the embodiment shown in Fig. 2 the valve A is operated by its hand wheel being formed as a chain wheel 5 secured to the valve spindle 7, the chain wheel being provided with two recesses so as to be operated by two separate chains 4 and 8 each connected to one of the piston rods $x$ and $x_1$ respectively from which their movement is transmitted. Each chain is provided with a weight 6, and the total gravity of the weights suffices to operate the valve.

The device operates as follows:

If the pressure after the valve should increase, the position of the slide-valve is influenced as described with reference to Fig. 1. By this the pressure in the pressure-cylinder D will increase and the piston $w$ will move to the left, the valve A being closed. The device operates in the same manner, if the pressure decreases before the valve, the other cylinder then closing the valve.

The device allows the valve to be closed always, if the pressure after the valve be increased, independent of whether the pressure before the valve should increase, and on account thereof tend to close the valve. This will only result in slackening of one of the chains.

Figs. 3 and 5 illustrate an embodiment in which a common pressure cylinder $D_1$ is used. In this case the two slide-valves are connected in such manner that the two inlets $h$ and $h_1$ are combined to a single inlet $h_2$, the pipe $o$ leading to the outlet $k_1$. $k$ designates the outlet from the slide-valve housing C.

The pressure pipe $o_1$ is connected with the pressure cylinder $D_1$. The spring $v_1$ corresponding to the spring 3 in Fig. 1 is in this embodiment placed beneath the piston $w_1$.

The manner of operation is as follows:

Supposing the pressure increases in the conduit $a$ before the valve, an increase of pressure will be created in the bellows $c_1$, the conduit $f_1$ and the chamber $r_1$. The slide valve $i_1$ is moved to the left, the pressure pipe $o_1$ being connected with the inlet pipes $h_1$ and $h_2$ respectively. Consequently an increase of pressure takes place in $D_1$ actuating the piston $w_1$ which is moved downwards, the valve A being somewhat opened allowing the pressure to decrease before the valve.

If for instance the pressure increases before as well as behind the valve A one of the impulses will obviously tend to open the valve, the other impulse tending to close the same. If the impulses are of equal strength no movement of the valve will take place. It being, however, of importance that the impulse before the valve should be regulating, the device is to be so constructed that the action of the last-named impulse be predominant. Fig. 3 illustrates a constructional form in which said purpose is attained, the device $B_1$—$C_1$—$D_1$ preponderating over the device B—C—$D_1$.

In the modification shown in Figs. 4 and 6, the main control member A in conduit $a$ is controlled by means of a single servo-motor, a single slide valve and a plurality of relays.

Pipe $b$ connects conduit $a$ with the bellows $c$ in relay B and transmits pressure impulses to the bellows whereby changes of pressure in conduit $a$ behind valve A are caused to actuate bellows $c$ and the movable part $e$ described as a plate. Movement of plate $e$ controls by a throttling action the jet of liquid issuing from the end of conduit $f$ which conducts a stream of liquid from pressure chamber $r$ of the slide valve housing C into the relay from which the liquid passes out through pipe $g$. The throttling of the stream of liquid in relay B causes changes of pressure in conduit $f$ in turn causing changes of pressure in pressure chamber $r$. Pressure chamber $r$ is formed partly by the diaphragm $l$ and partly by the slide valve housing. Changes of pressure in chamber $r$ cause a movement of diaphragm $l$ which in turn effects the operation of the slide valve as set out more in detail below.

The other relay $B_1$ and associated parts and their operation are obvious from above descriptions. As in the previous modifications the relays B and $B_1$ are reverse in operation as regards controlling the respective streams of liquid. Similar changes in the impulses operating the relays cause, in the one case, a decrease of flow of liquid into the relay and in the other case an increase of flow of liquid. For example, a rise of pressure in bellows $c$ of relay B increases the flow through conduit $f$ whereas a rise of pressure in bellows $c'$ decreases the flow through conduit $f_1$. Conduit $f_1$ conducts a stream of liquid from pressure chamber $r_1$ to relay $b_1$. Pressure chamber $r_1$ is formed partly by diaphragm $l_1$ and partly by slide valve housing C. Diaphragm $l_1$ is connected to the slide valve and to the housing. The part of slide valve $i$ to which diaphragm $l_1$ is attached and with which it moves is co-extensive with recesses $u$, which are arranged in the same manner as in the previous modifications, and controls communication between the recesses, whereby communication is effected either between the servo-motor D and the liquid pressure inlet $h$ or the servo-motor and the liquid pressure outlet $k$. The two pressure chambers $r$ and $r_1$ are supplied with liquid under pressure in parallel from the source of pressure liquid $h$ through restricted channels $z$ and $z_1$. By means of a loose abutment $i_3$ between the part $i_2$ to which diaphragm $l$ is attached and the slide valve proper $i$, the two parts $i$ and $i_2$ are capable of relative movement.

The operation of the modification shown in Fig. 4 is as follows:

Assume that the pressure in conduit $a$ in front of valve A increases. The pressure then rises in pipe $b_1$, causing an expansion of bellows $c_1$ which moves the plate $e_1$ closer to the orifice of conduit $f_1$. This increases the pressure in conduit $f_1$ and in chamber $r_1$. Increase of pressure in chamber $r_1$ causes a movement of diaphragm $l_1$ to the right, in turn causing slide valve $i$ to move to the right. By this means the middle recess $u$ is connected with the right hand recess $u$ and communication is established between the inlet $h$ and servo-motor D. Pressure liquid then enters the servo-motor D and causes piston $w$ to open the valve A.

In reverse manner, a decrease of pressure in pipe $b_1$ causes a closing of valve A by causing movement of slide valve $i$ to the left under the influence of spring $m_1$ and establishing communication between the servo-motor and outlet $k$.

Suppose the pressure in conduit $a$ behind valve A decreases. The pressure in pipe $b$ then decreases causing bellows $c$ to collapse somewhat, moving plate $e$ closer to the orifice of conduit $f$. This increases the pressure in conduit $f$ and in pressure chamber $r$. Increase of pressure in chamber $r$ causes a movement of diaphragm $l$ and slide valve parts $i$ and $i_2$ to the right, overcoming the force of spring $m_1$, and establishing communication between inlet $h$ and servo-motor D, thus opening valve A. Spring $m_1$ must obviously be designed and adjusted with respect to the liquid pressure and the effect particular pressures are to have on the operation.

Suppose pressure in pipe $b$ increases due to increase in pressure in conduit $a$ behind the valve. The bellows $c$ will then expand moving plate $e$ away from the orifice of conduit $f$ whereby pressure in chamber $r$ is decreased. Due to the separation at abutment $i_3$ the movement of diaphragm $l$ to the left due to decrease of pressure in chamber $r$ may not effect the movement of the slide valve proper $i$, depending on the momentary relative forces exerted by spring $m_1$ and the pressure of liquid in chamber $v_1$. Suppose, for example, that an increase of pressure in conduit $a$ in front of valve A has caused an increase of pressure in chamber $r_1$ whereby the force of spring $m_1$ is overcome and slide valve $i$ is moved to the right, establishing communication between the inlet $h$ and servo-motor D. Under these conditions a movement of part $i_2$ to the left due to decrease of pressure in chamber $r$ has no effect on the communication between recesses $u$ but simply separates the two parts $i$ and $i_2$ at the abutment $i_3$.

Thus the tendency of the pressure in front of valve A to open the valve predominates over the tendency of the pressure behind the valve to close it regardless of relative values of the pressures.

Suppose, on the other hand, a drop in pressure behind valve A occurs so that the pressure in chamber $r$ is increased sufficiently to move slide valve $i$ to the right and establish communication between inlet $h$ and the servo-motor. Under these conditions a drop in pressure in chamber $r_1$ due to decreased pressure before the valve, has no effect, since the liquid pressure in chamber $r$ will hold the slide valve to the right.

Thus the tendency of pressure behind the valve to open the valve predominates over the tendency of the pressure in front of the valve to close the same.

Thus either impulse can open the valve regardless of the tendency of the other impulse to close the valve.

It is of importance that the piston valve be divided into two parts, so that, within certain limits, the two diaphragms are capable of operating independent of each other, in such cases where the one impulse predominates over the other one.

While we have described the invention with regard to certain more or less specific modifications it is nevertheless obvious that various changes in the construction, combination and arrangement of parts may be made without departing from the spirit and scope of the invention.

What we claim as new and desire to secure by Letters Patent of the United States is:—

1. In a control apparatus adapted to be influenced by separate impulses, the combination of a main control member, liquid pressure operated means to control the position of said member, liquid pressure operated means to control the operation of the first mentioned means, separate streams of liquid under pressure for operating each of said means and means responsive to said impulses to control the operation of said second means.

2. In a control apparatus adapted to be influenced by separate impulses, the combination of a main control member, liquid pressure operated means to control the position of said member, liquid pressure operated means to control the operation of the first-mentioned means, a source of liquid under pressure supplying liquid in separate streams in parallel to both said means, and a plurality of independent means, each responsive to one of said impulses, to control the operation of the second-mentioned means.

3. In a control apparatus adapted to be influenced by separate impulses, the combination of a main control member, liquid pressure operated means to regulate the position of said member, liquid pressure operated means to control the operation of the first-mentioned means, means to supply liquid under pressure, in separate streams, in parallel, to said above-mentioned means, and separate relays each responsive to one of said impulses and adapted to control the liquid under pressure operating the second-mentioned means.

4. In a control apparatus adapted to be influenced by separate impulses, the combination of a main control member, liquid pressure operated means to regulate the position of said member, liquid pressure operated means to control the pressure in the liquid operating the first-mentioned means, means to supply liquid, to said above-mentioned means, and separate relays each responsive to one of said impulses and adapted to control the liquid under pressure operating the second-mentioned means.

5. In a control apparatus adapted to be influenced by separate impulses, the combination of a main control member, a servo-motor comprising a cylinder and a movable part therein connected with said main control member, means to supply liquid under pressure to said servo-motor, a second means to control the supply of pressure liquid to said servo-motor and separate means each responsive to one of said impulses to indirectly control the operation of the said second means.

6. In a control apparatus adapted to be influenced by separate impulses, the combination of a main control member, a plurality of independent relays each responsive to an impulse, liquid pressure operated means independently responsive to each of said relays, a second liquid pressure operated means controlled by said first means and adapted to operate said main control member and independent streams of liquid for controlling said first and second means.

7. In a control apparatus adapted to be influenced by separate impulses, the combination of a valve member, a servo-motor comprising a cylinder and a piston connected to said valve member and movable therein, means to lead pressure liquid to and to return liquid from the servo-motor, second liquid pressure operated means to control the pressure in the servo-motor, and separate relays each responsive to one of said impulses and each communicating with the said second means and adapted to control the pressure in the liquid operating the same.

8. In a control apparatus adapted to be influenced by separate impulses, the combination of a main control member, liquid pressure operated means to regulate the position of said member, separate relays each responsive to one of said impulses, separate streams of liquid flowing to said relays and controlled by the same, means whereby said streams of liquid operate upon a slide valve and means whereby the slide-valve controls the operation of the first mentioned means.

9. In a control apparatus adapted to be influenced by separate impulses, the combination of a valve member, a servo-motor to regulate the position of said valve member, said servo-motor comprising a cylinder and a piston therein, separate relays each responsive to one of said impulses and each adapted to control a separate stream of liquid, means whereby said streams of liquid operate upon a slide valve and means whereby said slide valve controls the passage of liquid to and from said servo-motor.

10. In a control apparatus adapted to be influenced by separate impulses, the combination of a valve member, a liquid pressure operated servo-motor to control the said valve member, separate relays each responsive to one of said impulses, means to pass liquid in parallel to each of said relays and to said servo-motor, means within each relay to control the liquid passing thereto, means whereby the liquid passing to each relay operates on actuating means and means whereby the actuating means controls the pressure of liquid in said servo-motor.

11. In a control apparatus adapted to be influenced by a plurality of impulses, a conduit, a main valve in said conduit, a servo-motor to control the position of said main valve, a slide valve, a liquid communication between said slide valve and said servo-motor, said slide valve being made of two parts, a plurality of relays, liquid communication between said slide valve and said plurality of relays, one of said relays being responsive to the pressure in the conduit before the valve and the other to the pressure in the conduit behind the main valve 12. In a control apparatus, a main conduit, a valve in said conduit, a first relay, a second relay, a stream of liquid flowing into said first relay, a stream of liquid flowing into said second relay, means whereby said streams of liquid control said valve, means to decrease the flow of liquid into the first relay upon rise of pressure in said conduit on one side of the valve, and means to increase the flow of liquid into the second relay upon rise of pressure in said conduit on the other side of the valve.

13. In a control apparatus, a main conduit, a valve in said conduit, a first relay, a second relay, a pipe connecting said first relay with said conduit on one side of said valve, a pipe connecting said second relay with said conduit on the other side of said valve, movable means in said relays connected with said pipes and adapted to be influenced by pressure changes therein, a stream of liquid flowing into said first relay, a stream of liquid flowing into said second relay, means connected with the movable part in the first relay to decrease the flow of liquid into said first relay upon rise of pressure, means connected with the movable part in the second relay to increase the flow of liquid into said second relay upon rise of pressure and means whereby said streams of liquid indirectly control said valve.

14. In a control apparatus adapted to be influenced by a plurality of impulses, a main control member, liquid pressure operated means to regulate the position of said member, a slide valve to control said regulating means, a housing for said slide valve, diaphragms connected to said slide valve, a plurality of pressure chambers formed by said housing and said diaphragms, a plurality of impulse responsive relays, and a pipe connecting each of said pressure chambers with a separate relay.

15. In a control apparatus adapted to be influenced by a plurality of impulses, a main control member, liquid pressure operated means to regulate the position of said member, a slide valve to control said regulating means, a plurality of diaphragms connected with said slide valve, said slide valve and diaphragms being arranged so that the diaphragms can have relative movement, means operating to move said diaphragms in response to separate impulses.

16. In a control apparatus adapted to be influenced by a plurality of impulses, a main control member, liquid pressure operated means to regulate the position of said member, a slide valve to control said regulating means, a housing for said slide valve, a plurality of diaphragms connected with said slide valve and forming pressure chambers with said housing, an outlet recess, an inlet recess and a recess connected with said regulating means, a part of said slide being firmly fixed to one of said diaphragms and coextensive with said recesses, a second part of said slide abutting the first part and in loose contact therewith and connected to a second of said diaphragms and means to control the pressure in said pressure chambers.

17. In a control apparatus adapted to be influenced by a plurality of impulses, a main control member, liquid pressure operated means to regulate the position of said member, a slide valve to control said regulating means, a housing for said slide valve, a recess communicating with said regulating means, an inlet recess, an outlet recess, said recesses and slide valve being arranged so that said slide valve controls communication between the recesses to regulate flow of liquid to and from the regulating means, a diaphragm connected with said slide valve, and adapted on movement to control communication between said recesses, a second diaphragm, a loose abutment whereby movement of said second diaphragm in one direction under certain conditions has no effect on the communication between said recesses and means to move said diaphragms responsive to separate impulses.

18. In a control apparatus adapted to be influenced by a plurality of impulses, a main control member, liquid pressure operated means to regulate the position of said member, a slide valve to control said regulating means, recesses associated with said slide valve, a diaphragm connected to said slide valve and adapted on movement to control communication between said recesses, a second diaphragm, a loose abutment whereby movement of said second diaphragm under certain conditions has no effect on the communication between said recesses and means to move said diaphragms.

19. In a control apparatus adapted to be influenced by a plurality of impulses, a main control member, liquid pressure operated means to regulate the position of said member, a slide valve to control said regulating means, a housing for said slide valve, recesses associated with said slide valve and housing one of which communicates with said regulating means, a diaphragm connected with said slide valve and adapted upon movement to control communication between said recesses, a second diaphragm, a loose abutment whereby the movement of said second diaphragm under certain conditions has no effect on the communication between said recesses, pressure chambers formed by said diaphragms and said housing, means to supply liquid to said chambers, a plurality of relays, a stream of liquid flowing from each pressure chamber to each relay and means in the relays to control the respective streams.

20. In a control apparatus, a main conduit, a valve in said conduit, a liquid pressure operated servo-motor to regulate the position of said valve, a slide valve to control said servo-motor, a housing for said slide valve, recesses associated with said slide valve and housing one of which communicates with said servo-motor, a diaphragm connected with said slide valve and adapted on movement to control communication between said recesses, a second diaphragm, a loose abutment whereby the movement of said second diaphragm under certain conditions has no effect on the communication between said recesses, a first pressure chamber formed by the first diaphragm and the housing, a second pressure chamber formed by the second diaphragm and the housing, means to supply liquid to said pressure chambers, a first relay, a second relay, a first stream of liquid flowing from said first pressure chamber into said first relay, a second stream of liquid flowing from said second pressure chamber into said second relay, a pipe connecting said first relay with said conduit on one side of said valve, a movable part in said first relay affected by changes in pressure in said conduit transmitted through said pipe and operating to decrease the flow of liquid into the first relay upon rise of pressure, a second pipe connecting said conduit on the other side of said valve with said second relay, and a movable part in said second relay affected by changes in pressure in said conduit transmitted through said pipe and operating to increase the flow of liquid into the second relay upon rise of pressure.

21. In a control apparatus, a main conduit, a valve in said conduit, a liquid pressure operated servo-motor to regulate the position of said valve, a slide valve to control said servo-motor, a housing for said slide valve, recesses associated with said slide valve and housing one of which communicates with said servo-motor, a diaphragm connected with said slide valve and adapted on movement to control communication between said recesses, a second diaphragm, a loose abutment whereby the movement of said second diaphragm under certain conditions has no effect on the communication between said recesses, a first pressure chamber formed by the first diaphragm and the housing, a second pressure chamber formed by the second diaphragm and the housing, means to supply liquid to said pressure chambers, a first relay, a second relay, a first stream of liquid flowing from one of said pressure chambers into said first relay, a second stream of liquid flowing from the other of said pressure chambers into said second relay, a pipe connecting said first relay with said conduit on one side of said valve, a movable part in said first relay affected by changes in pressure in said conduit transmitted through said pipe and operating to decrease the flow of liquid into the first relay upon rise of pressure, a second pipe connecting said conduit on the other side of said valve with said second relay, and a movable part in said second relay affected by changes in pressure in said conduit transmitted through said pipe and operating to increase the flow of liquid into the second relay upon rise of pressure.

22. In a control apparatus adapted to be influenced by a plurality of impulses, a main control member, a first relay, a second relay, a stream of liquid flowing into said first relay, a stream of liquid flowing into said second relay, means whereby said streams of liquid control said main control member, means in said relays to control said streams of liquid and movable in response to separate impulses, said means being so arranged with respect to said streams of liquid that similar changes in the impulses operating the said means cause, in one relay a decrease of flow of liquid and in the other relay an increase of flow.

In witness whereof we have hereunto set our hands.

NILS FRENNE.
ÅKE GÖRAN SAXBERG.